(12) United States Patent
Singh et al.

(10) Patent No.: US 8,818,348 B1
(45) Date of Patent: Aug. 26, 2014

(54) SYSTEMS AND METHODS FOR SELECTIVELY ENABLING AND DISABLING SECONDARY-BAND RADIOS VIA PRIMARY-BAND SIGNALING

(71) Applicant: Sprint Spectrum L. P., Overland Park, KS (US)

(72) Inventors: Jasinder P. Singh, Olathe, KS (US); Maulik K. Shah, Overland Park, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 11 days.

(21) Appl. No.: 13/668,973

(22) Filed: Nov. 5, 2012

(51) Int. Cl.
*G06F 15/16* (2006.01)

(52) U.S. Cl.
USPC ........................................ 455/418; 455/435.1

(58) Field of Classification Search
USPC .................... 455/418, 421, 433, 435.1, 435.2
See application file for complete search history.

(56) References Cited

U.S. PATENT DOCUMENTS

2013/0267227 A1* 10/2013 Bao et al. .................. 455/435.1

* cited by examiner

*Primary Examiner* — Sam Bhattacharya

(57) ABSTRACT

Disclosed herein are systems and methods for selectively enabling and disabling secondary-band radios via primary-band signaling. In one embodiment, at least one RAN entity provides service to a multi-band-capable access terminal that comprises a first radio arranged to communicate over a first radio band and a second radio arranged to communicate over a second radio band, wherein the access terminal is arranged to prefer the first radio band to the second. The at least one RAN entity makes a secondary-radio-disabling determination, which includes determining that the access terminal is located in a vicinity of a particular set of one or more base stations that operate on the second radio band. Responsive to making the secondary-radio-disabling determination, the at least one RAN entity sends to the first radio over the first radio band a command that the multi-band-capable access terminal disable the second radio.

20 Claims, 5 Drawing Sheets

SYSTEMS AND METHODS FOR SELECTIVELY ENABLING AND DISABLING SECONDARY-BAND RADIOS VIA PRIMARY-BAND SIGNALING

BACKGROUND

In today's modern society, it has become quite common, and is becoming more so every day, for people to use client-side communication devices referred to generally herein as "access terminals" to communicate wirelessly with and/or via one or more radio access networks (RANs) in order to engage in communication sessions such as voice calls, text messaging, and data sessions with one or more other communication devices. In this disclosure, the term "access terminals" broadly encompasses a wide gamut of types of communication devices that in other contexts may be referred to alternately or additionally as cell phones, smartphones, personal digital assistants (PDAs), mobile stations, mobile devices, user equipment, and the like, and including but not limited to laptop and tablet computers.

Each of the one or more other communication devices with which a given access terminal may be communicating at a given time may be or include another access terminal, an Ethernet-based telephone, a gateway, a server, and/or any other suitable type of communication device. Furthermore, each such other communication device may be arranged to communicate in a wired and/or wireless manner, and may be connected to the same RAN to which the given access terminal is connected, may be connected to a different RAN, or may be connected to some other network such as the Internet or the public switched telephone network (PSTN), as examples. Typically, the RAN to which an access terminal is connected is arranged to directly or indirectly provide connectivity to that access terminal (and other access terminals) with one or more of what are known as "transport networks," the Internet and the PSTN being two examples.

The wireless communications (e.g., signaling and traffic) between an access terminal and a RAN are typically bi-directional in nature. The portion of those communications that are sent by the RAN to the access terminal are typically described as being sent on the "forward link," while the portion that are sent by the access terminal to the RAN are typically described as being sent on the "reverse link." The communications on both links are typically formatted according to a wireless-communication type, protocol, and/or standard, some examples of which include Code Division Multiple Access (CDMA) (e.g., Single Carrier Radio Transmission Technology (1xRTT) CDMA (e.g., IS-95, IS-2000), Evolution Data Optimized (EV-DO) (IS-856)), Time Division Multiple Access (TDMA), Global System for Mobile Communications (GSM), Long Term Evolution (LTE), Wi-Fi (IEEE 802.11), WiMAX (IEEE 802.16), and the like.

With respect to RANs that are of a type often referred to as "wireless wide area networks (WWANs)" or "cellular wireless networks" among other labels, the particular RAN entity with which an access terminal communicates over the air interface is often referred to by terms such as "base station" or "access node," among others, terms which are used at different times in different ways to refer to different RAN entities or sets of RAN entities. For example, the term "base station" is sometimes used simply to refer to a device often referred to as a "base transceiver station (BTS)" (or "eNodeB"), which contains the hardware, antennas, and so forth that actually conduct the over-the-air portion of the communication with the access terminal on behalf of the RAN. At times, however, the term "base station" or "access node" is used to refer to a combination of (i) one or more BTSs and (ii) a device often referred to as a "base station controller (BSC)" (or "radio network controller (RNC)"), which controls one or more BTS(s) and connects it (them) to the rest of the RAN and typically beyond.

In a typical scenario, an access terminal registers with a RAN via a particular BTS, and then operates in what is known as "idle mode" on a carrier frequency in a coverage area (e.g., a sector) provided by that BTS. If another communication device attempts to contact the access terminal, the RAN will typically page the access terminal via at least that BTS. The access terminal would then typically respond by requesting and establishing communication with the RAN on what is known as an air-interface traffic channel (or simply a "traffic channel") in order to thereafter conduct the requested communication session over that traffic channel. If instead the access terminal is the initiator of a communication session (perhaps when its user requests a webpage), the access terminal would typically send the RAN what is often referred to as an "access-request message" (or "access probe") in order to request and establish communication on a traffic channel and then conduct the relevant communication over that traffic channel.

Traffic channels take different forms under different types of air-interface protocols. In TDMA networks for example, traffic channels typically take the form of one or more timeslots of a repeating waveform on a carrier frequency used by multiple access terminals. In other words, in TDMA networks, different access terminals on different traffic channels take turns using the full transmit power of the base station at different times. In CDMA networks by contrast and further by way of example, different access terminals on different traffic channels simultaneously share the transmit power of the base station. In such networks, different traffic channels are delineated by the RAN—on the forward link, and the access terminal on the reverse link—applying different codes (referred to as "spreading codes") to different communications.

OVERVIEW

Some access terminals, referred to herein as "multi-band-capable access terminals," are arranged to be able to conduct wireless communications with various RANs on various different bands (i.e., specified frequency ranges) of the radio portion of the electromagnetic spectrum. To be able to do so, multi-band-capable access terminals are typically equipped with different radio-communication interfaces (hereinafter "radios") that are respectively designated and configured for communicating over the various bands. In various different implementations, designs, and architectures of various different multi-band-capable access terminals, the different radios could take the form of distinct components, of different subcomponents of one or more other components, and/or any other arrangement deemed suitable by one of skill in the art. In the context of a given multi-band-capable access terminal, a given radio being "enabled" corresponds with the access terminal being capable (at that time) of communicating over the corresponding band, while a given radio being "disabled" corresponds with the access terminal being incapable (at that time) of communicating over the corresponding band.

In some cases, the wireless communications that a multi-band-capable access terminal engages in on one radio band are of the same type (e.g., LTE) as the wireless communications that the multi-band-capable access terminal engages in on a different radio band. This may be the case if, for example, the access terminal is arranged to treat one LTE network as its primary LTE network and to treat another LTE network as its secondary LTE network. In other cases, the communications that a multi-band-capable access terminal engages in on different bands are of different types, perhaps if the access terminal is arranged to treat a particular LTE network as its primary network for data communication and to treat a particular EV-DO network as its secondary network for data communication. And certainly many other arrangements could be used in various implementations with respect to the respective types of wireless communication that an access terminal is capable of engaging in on different bands, and to the priority orders among such bands that could be implemented by and for such access terminals.

Presently disclosed are systems and methods for selectively enabling and disabling secondary-band radios via primary-band signaling. One example scenario in which the present systems and methods may be used involves a certain set of multi-band-capable access terminals arranged to treat one particular band as their primary option for data communication, a different particular band as their secondary option for data communication, and yet another particular band as what is referred to herein as their "fallback" (i.e., lower priority than secondary as used herein) option for data communication.

For clarity of presentation, this example scenario is described in the context of a particular such multi-band-capable access terminal that is equipped with three radios: a primary radio for its primary band, a secondary radio for its secondary band, and a fallback radio for its fallback band; further to this example, both the primary and secondary bands correspond to LTE communications while the fallback band corresponds to EV-DO communications. In some embodiments, the primary band is a band known as "band 25," the secondary band is a band known as "band 41," and the fallback band is a band known as "band 26."

In the example scenario, when the RAN (perhaps as a result of being notified by the multi-band-capable access terminal) makes a determination that the multi-band-capable access terminal is currently located in a vicinity of a certain set of one or more base stations that operate on the secondary band. It is contemplated that such a determination could be made upon determining that the access terminal has actually entered a coverage area (e.g., geographical footprint) of such a set of base stations, but could instead or in addition be made upon determining that the access terminal is close to such a coverage area, is heading in the direction of such a coverage area, is about to change its paging tracking area, and/or one or more other similar location-related or location-and-motion-related determinations.

Upon making such a determination, and indeed in response to it, the RAN communicates a command to the multi-band-capable access terminal to instruct the access terminal to disable its secondary radio, thereby preventing the multi-band-capable access terminal from communicating over the secondary band with one or more base stations in the particular set. In at least one embodiment, the multi-band-capable access terminals with respect to which the present systems and methods are implemented are government-related access terminals. Furthermore, in at least one embodiment, the particular set of base stations that triggers such a command to be sent may be base stations that are associated with a particular base-station vendor, or perhaps base stations in a particular country or other geographic area, or perhaps base stations identified according to one or more other criteria, or perhaps some combination of two or more of these.

Upon detecting that the multi-band-capable access terminal is no longer in the vicinity of the set of particular base stations, or perhaps after an expiration of a predetermined timeout period, or perhaps in response to one or more other triggering events, or some combination of two or more of these, the RAN may then communicate a command to the multi-band-capable access terminal to instruct the access terminal to enable its secondary radio. In times when the secondary radio is disabled and the multi-band-capable access terminal is for first-band-capacity reasons and/or one or more other reasons seeking another connection, the access terminal may use its fallback radio to connect over its fallback radio band.

In some embodiments, the RAN communicates such commands to the access terminal in a manner transparent to the one or more base stations via which such commands are being sent. In some instances, such commands are sent from the RAN (e.g., from the core (e.g., a mobility management entity (MME)) of the RAN) to the access terminal using what is known as a non-access-stratum (NAS) protocol, which is known in the art as being a protocol to which even the base stations via which the messages are being sent are unaware of the content of the messages. Thus, such NAS messages can be sent via the very base stations that the RAN (or those setting RAN policy) prefer that access terminal not communicate with over the secondary band using the access terminal's secondary radio.

One embodiment takes the form of a method carried out by at least one RAN entity. In accordance with this embodiment, the method involves the at least one RAN entity providing service to a multi-band-capable access terminal that comprises a first radio arranged to communicate over a first radio band and a second radio arranged to communicate over a second radio band, wherein the multi-band-capable access terminal is arranged to prefer the first radio band to the second radio band. The method further involves the at least one RAN entity making a secondary-radio-disabling determination, wherein making the secondary-radio-disabling determination comprises making a determination that the multi-band-capable access terminal is located in a vicinity of a particular set of one or more base stations that operate on the second radio band. The method further involves, responsive to making the secondary-radio-disabling determination, the at least one RAN entity sending to the first radio over the first radio band a command that the multi-band-capable access terminal disable the second radio.

Another embodiment takes the form of at least one RAN entity, where the at least one RAN entity includes at least one wireless-communication interface, at least one processor, and data storage containing program instructions executable by the at least one processor for carrying out the just-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

I. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

II. Example Architecture

A. Example Communication System

Figure 1:
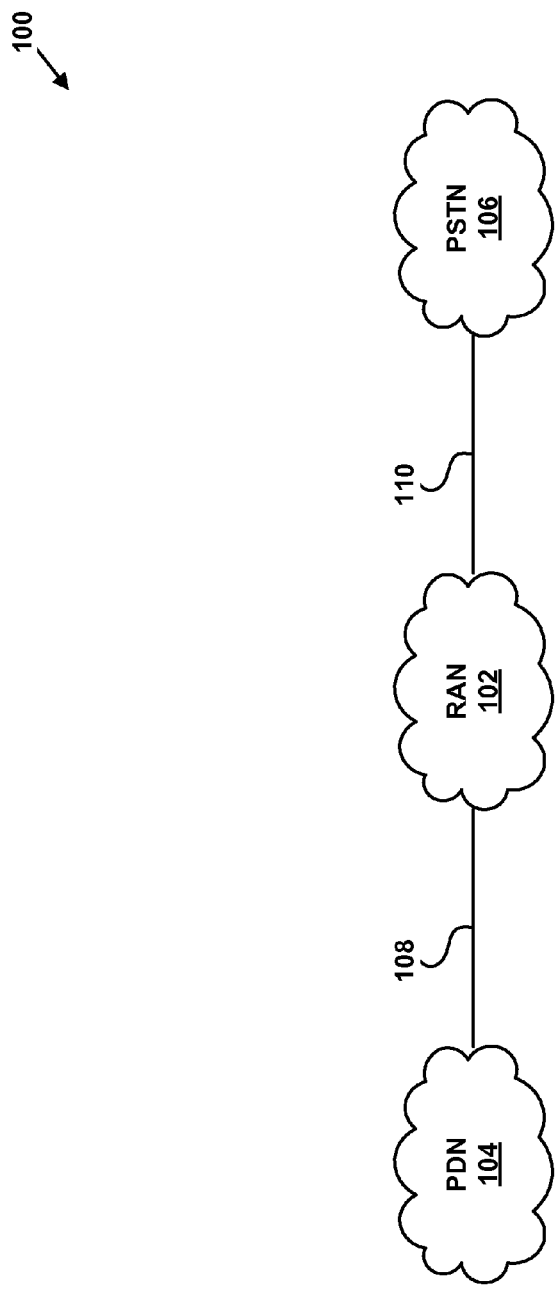
FIG. 1 depicts an example communication system.

Referring to the drawings, FIG. 1 depicts a communication system 100 that includes a RAN 102, a packet-data network (PDN) 104, and the PSTN 106. RAN 102 communicates with PDN 104 via a communication link 108, and with PSTN 106 via a communication link 110; either or both of these links may include one or more wired and/or wireless interfaces.

B. Example Radio Access Network (RAN)

Figure 2:
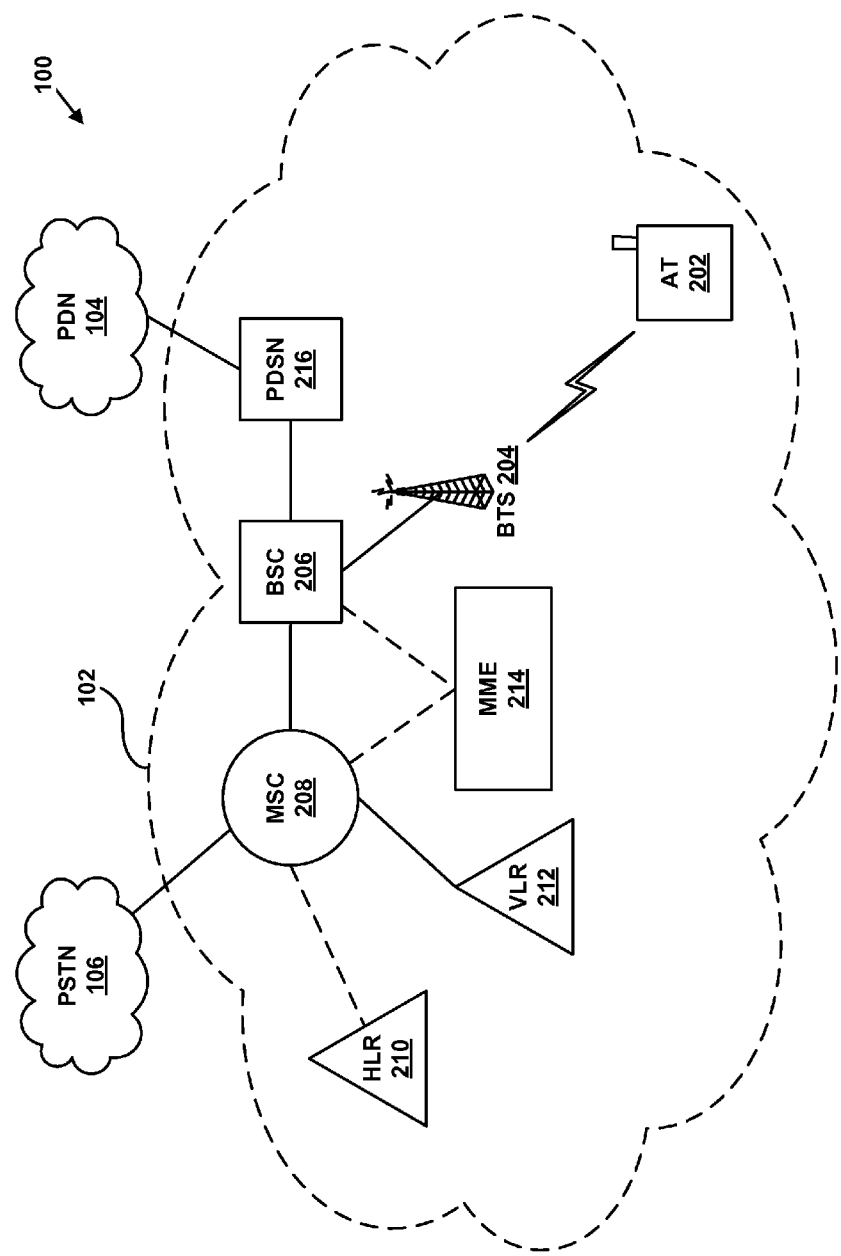
FIG. 2 depicts an example radio access network (RAN) in the context of the example communication system of FIG. 1.

FIG. 2 depicts communication system 100 with a more detailed depiction of RAN 102, which is shown in this example as including a multi-band-capable access terminal 202, a BTS 204, a BSC 206, a mobile switching center (MSC) 208, a home location register (HLR) 210, a visiting location register (VLR) 212, an MME 214, a packet data serving node (PDSN) 216. Additional entities could also be present, such as additional access terminals in communication with BTS 204, additional entities in communication with PDN 104 and/or PSTN 106, etc. Also, there could be one or more routers, switches, and/or other devices or networks making up at least part of one or more of the communication links. And other variations are possible as well.

Access terminal 202 may be any device arranged to carry out the multi-band-capable-access-terminal functions described herein, and is described more fully below in connection with FIG. 3. BTS 204 may be any network element arranged to carry out the BTS functions described herein. As such, BTS 204 may include a communication interface, a processor, and data storage comprising instructions executable by the processor to carry out those functions. The communication interface may include one or more antennas, chipsets, and/or other components for providing one or more coverage areas such as cells and sectors, for communicating with access terminal 202 over an air interface. The communication interface may be arranged to communicate according to one or more protocols mentioned herein and/or any others now known or later developed. The communication interface may also include one or more wired and/or wireless interfaces for communicating with at least BSC 206.

BSC 206 may be any network element arranged to carry out the BSC functions described herein. As such, BSC 206 may include a communication interface, a processor, and data storage comprising instructions executable by the processor to carry out those functions. The communication interface may include one or more wired and/or wireless interfaces for communicating with at least BTS 204, MSC 208, MME 214, and PDSN 216. In general, BSC 206 functions to control one or more BTSs such as BTS 204, and to provide one or more BTSs such as BTS 204 with connections to devices such as MSC 208, MME 214, and PDSN 216.

MSC 208 may be any networking element arranged to carry out the MSC functions described herein. As such, MSC 208 may include a communication interface, a processor, and data storage comprising instructions executable by the processor to carry out those functions. The communication interface may include one or more wired and/or wireless interfaces for communicating with at least BSC 206, HLR 210, VLR 212, MME 214, and PSTN 106. In general, MSC 208 functions as a switching element between PSTN 106 and one or more BSCs such as BSC 206, facilitating communication between access terminals and PSTN 106. When a given access terminal enters into a coverage area of RAN 102, the MSC 208 may detect the given access terminal and responsively update HLR 210 with the location of the given access terminal, and would typically also create a new record in VLR 212 for the access terminal. In other examples, a device such as MME 214 may manage the mobility of access terminals instead of or perhaps in addition to a combination of devices such as HLR 210 and VLR 212.

C. Example Multi-Band-Capable Access Terminal

Figure 3:
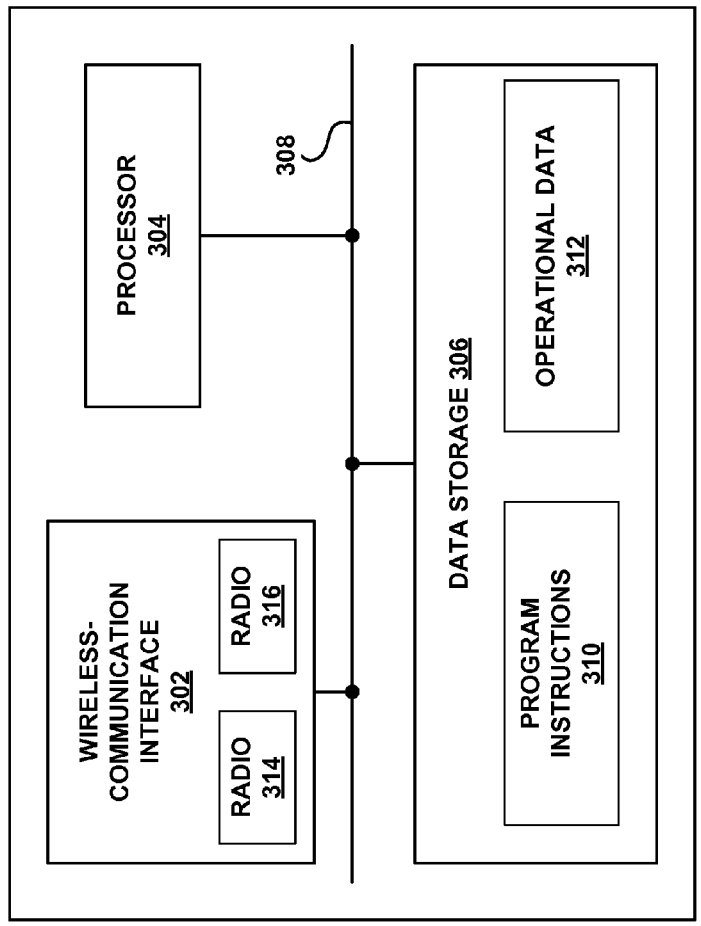
FIG. 3 depicts an example multi-band-capable access terminal.

FIG. 3 depicts an example multi-band-capable access terminal 300 as including a wireless-communication interface 302, a processor 304, data storage 306, and a user interface 308, all of which may be coupled together by a system bus, network, or other communication mechanism 310. It is contemplated that multi-band-capable access terminal 102 may have a structure similar to that of example multi-band-capable access terminal 300.

Wireless-communication interface 302 may comprise one or more antennae and one or more chipsets for communicating with one or more base stations over respective air interfaces. As an example, one such chipset could be one that is suitable for LTE communication. Indeed, wireless-communication interface 302 is depicted as including a first or primary radio 314 and a second or secondary radio 316, either of both of which may be arranged to be able to engage in LTE communication. In other embodiments, one or the other or both of radios 314 and 316 may be arranged to be able to engage in wireless communication according to one or more other protocols, types, and/or standards, such as those mentioned herein and/or any others now known or later developed. In some embodiments, wireless-communication interface 302 may contain one or more radios in addition to radios 314 and 316.

Processor 304 may comprise one or more general-purpose processors and/or one or more special-purpose processors, and may be integrated in whole or in part with wireless-communication interface 302. Data storage 306 may comprise one or more volatile and/or non-volatile storage components (such as magnetic, optical, flash, or other non-transitory storage) and may be integrated in whole or in part with processor 304. And certainly other configurations are possible. Data storage 306 may contain program instructions executable by processor 304 for carrying out various access-terminal functions described herein. And although not depicted, in various embodiments, access terminal 300 may include a user interface that itself may include one or more input devices such as a touchscreen, one or more buttons, a microphone, and the like for receiving inputs from users, as well as one or more output devices such a display, one or more indicator lights, a speaker, and the like for communicating outputs to users.

D. Example Radio Access Network (RAN) Entity

Figure 4:
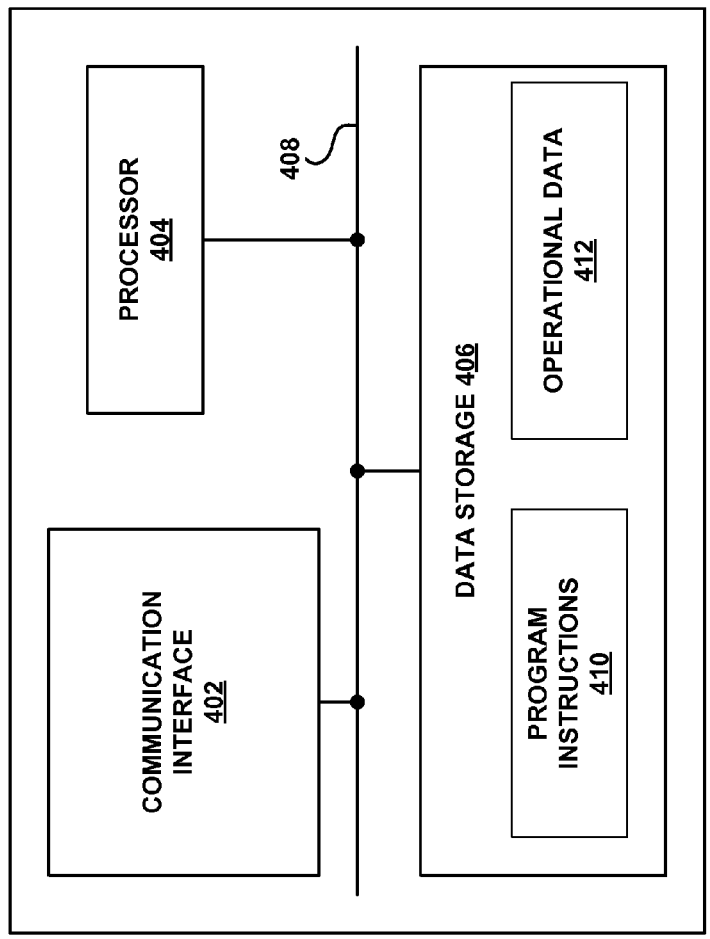
FIG. 4 depicts an example RAN entity.

FIG. 4 depicts an example RAN entity 400 as including a communication interface 402, a processor 404, and data storage 406, all of which may be coupled together by a system bus, network, or other communication mechanism 408. Communication interface 402 may include one or more interfaces (e.g., an Ethernet card) for engaging in wired communication and/or one or more interfaces (e.g., a Wi-Fi interface) for engaging in wireless communication. Processor 404 may comprise one or more general-purpose processors and/or one or more special-purpose processors, and may be integrated in whole or in part with communication interface 402. Data storage 406 may comprise one or more volatile and/or non-volatile storage components (such as magnetic, optical, flash, or other non-transitory storage) and may be integrated in whole or in part with processor 404. And certainly other configurations are possible. Data storage 406 may contain program instructions executable by processor 404 for carrying out various RAN-entity functions described herein. RAN entity 400 may also have a user interface and/or one or more other components deemed suitable for a particular context. In various different embodiments, devices that may have a structure similar to that depicted in FIG. 4 include BTS 204, BSC 206, MSC 208, HLR, 210, VLR 212, MME 214, and/or PDSN 216.

III. Example Operation

Figure 5:
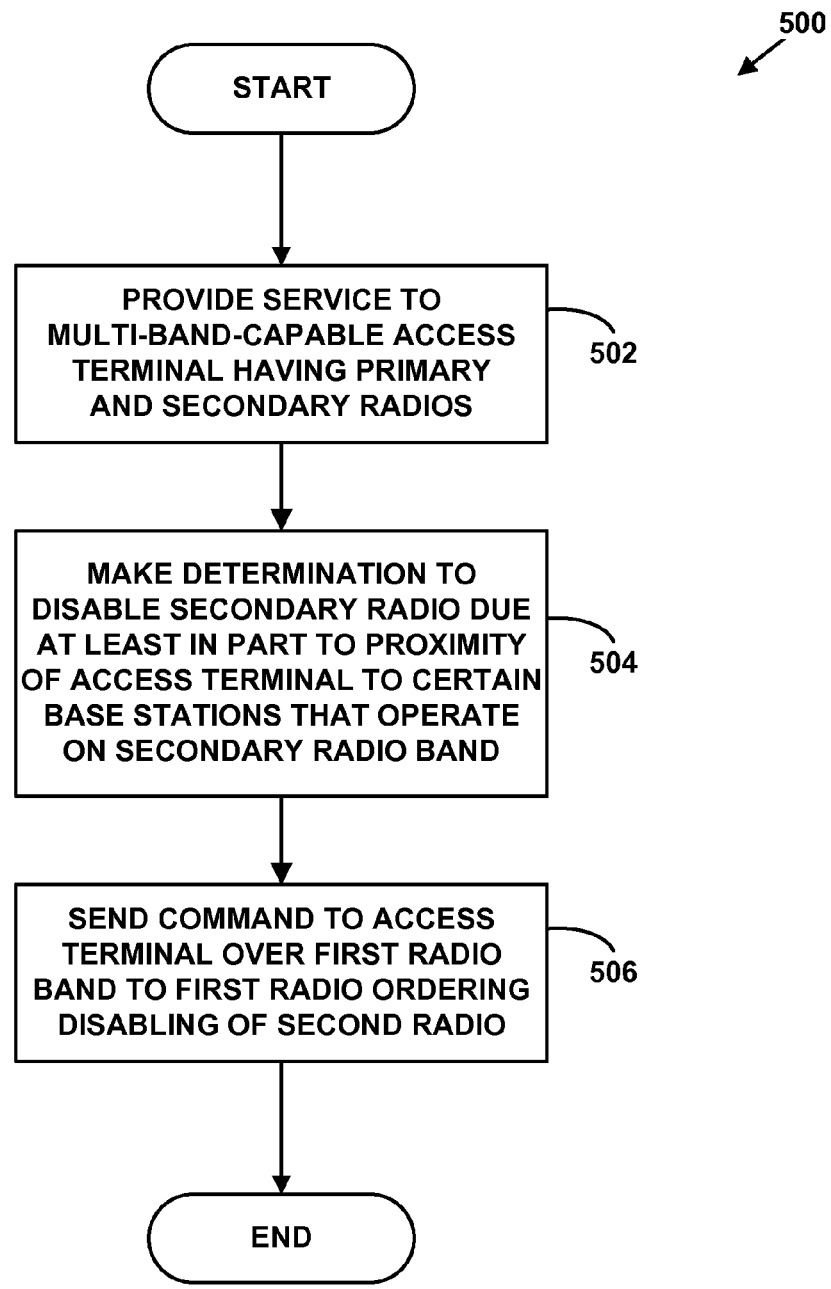
FIG. 5 depicts functions carried out in accordance with at least one embodiment.

FIG. 5 is a flowchart that depicts functions carried out in accordance with at least one embodiment. More particularly, FIG. 5 depicts a method 500 carried out by at least one RAN entity, which may include one or more of a base station, an access node, a BTS, an eNodeB, a BSC, an RNC, an MSC, an MME, an HLR, a VLR, and a server.

Method 500 begins at 502 with providing service to a multi-band-capable access terminal that has a first radio arranged to communicate over a first radio band and a second radio arranged to communicate over a second radio band, where the multi-band-capable access terminal is arranged to prefer the first radio band to the second radio band. The access terminal may be arranged to communicate over both the first radio band and the second radio band according to the same type of wireless communication (e.g., LTE). In some embodiments the first radio band is band 25. In some embodiments, the second radio band is band 41.

In some embodiments, the access terminal also has a third radio arranged to communicate over a third radio band, where the multi-band-capable access terminal is arranged to prefer the second radio band to the third radio band. In some such embodiments, the access terminal is arranged to communicate over the third radio band according to a second type of wireless communication different from the type of wireless communication the access terminal is arranged to use in connection with the first and/or second radio bands. In some embodiments, that second type of wireless communication is EV-DO.

Method 500 continues at 504 with making a secondary-radio-disabling determination, which involves making a determination that the multi-band-capable access terminal is located in a vicinity of a particular set of one or more base stations that operate on the second radio band. As described in more detail above, this determination could involve determining that the access terminal is within a particular coverage area or geographical footprint of the base stations in the particular set, or perhaps that the access terminal is headed in that direction. In at least one embodiment, the secondary-radio-disabling determination further comprises a determination that a current level of traffic on the first radio band in a vicinity of the multi-band-capable access terminal exceeds a traffic threshold. In at least one embodiment, the base stations in the particular set of one or more base stations that operate on the second radio band are associated with a particular base-station vendor.

Method 500 continues at 506 with, responsive to making the secondary-radio-disabling determination, sending to the first radio over the first radio band a command that the multi-band-capable access terminal disable the second radio. In at least one embodiment, sending the command involves sending the command using a NAS protocol. In at least one embodiment, this involves sending the command a core of the RAN to the multi-band-capable access terminal. In at least one such embodiment, sending the command from the core of the RAN involves sending the command from one or more of a BSC, an RNC, an MSC, an HLR, a VLR, an MME, and a server. In at least one embodiment, sending the command involves sending the command in a release message. In at least one embodiment, the multi-band-capable access terminal disables the second radio in response to receiving the command. In at least one embodiment, the at least one RAN entity later makes a secondary-radio-enabling determination and responsively sends to the multi-band-capable access terminal a command to enable the second radio.

IV. Conclusion

While some example embodiments have been described above, those of ordinary skill in the art will appreciate that numerous changes to the described embodiments could be made without departing from the scope and spirit of the claims.

We claim:

1. A method carried out by at least one radio access network (RAN) entity, the at least one RAN entity comprising at least one communication interface, at least one processor, and data storage having stored thereon program instructions executable by the at least one processor for carrying out the method, which comprises:

the at least one RAN entity providing service to a multi-band-capable access terminal that comprises a first radio arranged to communicate over a first radio band and a second radio arranged to communicate over a second radio band, wherein the multi-band-capable access terminal is arranged to prefer the first radio band to the second radio band;

the at least one RAN entity making a secondary-radio-disabling determination, wherein making the secondary-radio-disabling determination comprises making a determination that the multi-band-capable access terminal is located in a vicinity of a particular set of one or more base stations that operate on the second radio band; and responsive to making the secondary-radio-disabling determination, the at least one RAN entity sending to the first radio over the first radio band a command that the multi-band-capable access terminal disable the second radio.

2. The method of claim 1, wherein the at least one RAN entity comprises one or more of a base station, an access node, a base transceiver station (BTS), an eNodeB, a base station controller (BSC), a radio network controller (RNC), a mobile switching center (MSC), a mobility management entity (MME), a home location register (HLR), a visitor location register (VLR), and a server.

3. The method of claim 1, wherein the multi-band-capable access terminal is arranged to communicate over the first radio band according to a first type of wireless communication and is also arranged to communicate over the second radio band according to the first type of wireless communication.

4. The method of claim 3, wherein the first type of wireless communication is Long Term Evolution (LTE).

5. The method of claim 3, wherein the multi-band-capable access terminal further comprises a third radio arranged to communicate over a third radio band, and wherein the multi-band-capable access terminal is arranged to prefer the second radio band to the third radio band.

6. The method of claim 5, wherein the multi-band-capable access terminal is arranged to communicate over the third radio band according to a second type of wireless communication.

7. The method of claim 6, wherein the first type of wireless communication is Long Term Evolution (LTE).

8. The method of claim 7, wherein the second type of wireless communication is Evolution Data Optimized (EV DO).

9. The method of claim 1, wherein the secondary-radio-disabling determination further comprises a determination that a current level of traffic on the first radio band in a vicinity of the multi-band-capable access terminal exceeds a traffic threshold.

10. The method of claim 1, wherein the base stations in the particular set of one or more base stations that operate on the second radio band are associated with a particular base-station vendor.

11. The method of claim 1, wherein the second radio band is band 41.

12. The method of claim 11, wherein the first radio band is band 25.

13. The method of claim 1, wherein sending the command comprises sending the command using a non-access stratum (NAS) protocol.

14. The method of claim 13, wherein sending the command using a NAS protocol comprises sending the command from a core of the RAN to the multi-band-capable access terminal.

15. The method of claim 14, wherein sending the command from the core of the RAN comprises sending the command from one or more of a base station controller (BSC), a radio network controller (RNC), a mobile switching center (MSC), a home location register (HLR), a visitor location register (VLR), and a server.

16. The method of claim 14, wherein sending the command from the core of the RAN comprises sending the command from a mobility management entity (MME).

17. The method of claim 1, wherein sending the command comprises sending the command in a release message.

18. The method of claim 1, wherein the multi-band-capable access terminal disables the second radio in response to receiving the command.

19. The method of claim 1, further comprising the at least one RAN entity making a secondary-radio-enabling determination and responsively sending to the multi-band-capable access terminal a command to enable the second radio.

20. A system comprising at least one radio access network (RAN) entity, wherein the at least one RAN entity comprises:
   at least one wireless-communication interface;
   at least one processor; and
   data storage containing program instructions executable by the at least one processor for carrying out a set of functions, wherein the set of functions includes:
   providing service to a multi-band-capable access terminal that comprises a first radio arranged to communicate over a first radio band and a second radio arranged to communicate over a second radio band, wherein the multi-band-capable access terminal is arranged to prefer the first radio band to the second radio band;
   making a secondary-radio-disabling determination, wherein making the secondary-radio-disabling determination comprises making a determination that the multi-band-capable access terminal is located in a vicinity of a particular set of one or more base stations that operate on the second radio band; and
   responsive to making the secondary-radio-disabling determination, sending to the first radio over the first radio band a command that the multi-band-capable access terminal disable the second radio.

* * * * *